US007890769B2

(12) United States Patent
Chen et al.

(10) Patent No.: US 7,890,769 B2
(45) Date of Patent: Feb. 15, 2011

(54) SYSTEM AND METHOD FOR SECURE CODE DOWNLOADING

(75) Inventors: Sherman (Xuemin) Chen, San Diego, CA (US); Steve W. Rodgers, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1086 days.

(21) Appl. No.: 10/911,337

(22) Filed: Aug. 4, 2004

(65) Prior Publication Data

US 2006/0031685 A1 Feb. 9, 2006

(51) Int. Cl.
*G06F 12/14* (2006.01)

(52) U.S. Cl. ...................................................... 713/190

(58) Field of Classification Search .................. 713/190
See application file for complete search history.

(56) References Cited

U.S. PATENT DOCUMENTS

| | | | | | |
|---|---|---|---|---|---|
| 6,118,870 | A * | 9/2000 | Boyle et al. | | 380/201 |
| 6,820,203 | B1 * | 11/2004 | Okaue et al. | | 713/193 |
| 7,225,341 | B2 * | 5/2007 | Yoshino et al. | | 713/193 |
| 2003/0097563 | A1 * | 5/2003 | Moroney et al. | | 713/170 |
| 2003/0149854 | A1 * | 8/2003 | Yoshino et al. | | 711/173 |
| 2004/0123132 | A1 * | 6/2004 | Montgomery et al. | | 713/200 |
| 2004/0177215 | A1 * | 9/2004 | Nagamasa et al. | | 711/103 |
| 2005/0009481 | A1 * | 1/2005 | Bushner | | 455/132 |

OTHER PUBLICATIONS

FIPS PUB 180-1, "Secure Hash Standard", Federal Information Processing Standards Publication (Apr. 17, 1995).
FIPS PUB 197, "Advanced Encryption Standard (AES)" (Nov. 26, 2001).
FIPS PUB 46-3, "Data Encryption Standard (DES)", Federal Information Processing Standards Publication (Oct. 25, 1999).
FIPS PUB 186-1, "Data Signature Standard (DSS)", Federal Information Processing Standards Publication (Dec. 15, 1998).
FIPS PUB 186-2, "Data Signature Standard (DSS)", Federal Information Processing Standards Publication (Jan. 27, 2000).
"PKCS #1: RSA Encryption Standard", RSA Laboratories Technical Note, Version 1.5 (Nov. 1, 1993).
"PKCS #3: Diffie-Hellman Key-Agreement Standard", RSA Laboratories Technical Note, Version 1.4 (Nov. 1, 1993).
H. Krawczyk et al., IETF RFC 2104, "HMAC : Keyed-Hashing for Message Authentication" (Feb. 1997).
PKCS #1 v2.1:RSA Encryption Standard, RSA Laboratories Technical Note, ver. 2.1 (Draft 2—Jan. 5, 2001).

* cited by examiner

*Primary Examiner*—Kambiz Zand
*Assistant Examiner*—Teshome Hailu
(74) *Attorney, Agent, or Firm*—McAndrews, Held & Malloy, Ltd.

(57) ABSTRACT

Systems and methods that support secure code downloading are provided. In one embodiment, a method that securely downloads code may include, for example, one or more of the following: receiving a command in a security processor; loading an encryption or decryption key based on the received command; configuring the security processor with a selected scrambling type and a selected signature type based on the received command; and processing incoming code using the loaded encryption or decryption key and the configured security processor.

41 Claims, 5 Drawing Sheets

SYSTEM AND METHOD FOR SECURE CODE DOWNLOADING

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The safeguarding of code downloaded to a device such as, for example, a set-top box has proven to be a challenging topic especially since the set-top box tends to be physically located in the subscriber's home. With such proximity, an attacker has the opportunity to freely observe and to interfere with the execution of code at the set-top box.

For example, code being transmitted to the set-top box can be intercepted and corrupted (e.g., modified for the benefit of the attacker) before being passed along to the set-top box for execution. The set-top box may just blindly execute the corrupted code.

Furthermore, an attacker may glean valuable information (e.g., billing information, credit card information, viewing preferences, etc.) from a legitimate subscriber by capturing clear text communications between the set-top box and a central server or by tapping into unsecured processing elements in the set-top box.

Further limitations and disadvantages of conventional and traditional approaches will become apparent to one of ordinary skill in the art through comparison of such systems with one or more aspects of the present invention as set forth in the remainder of the present application with reference to the drawings.

BRIEF SUMMARY OF THE INVENTION

Aspects of the present invention may be found in, for example, systems and methods that support secure code downloading.

In one embodiment according to certain aspects of the present invention, a method that securely downloads code may include, for example, one or more of the following: receiving a command in a security processor; loading an encryption or decryption key based on the received command; configuring the security processor with a selected scrambling type and a selected signature type based on the received command; and processing incoming code using the loaded encryption or decryption key and the configured security processor.

In another embodiment according to certain aspects of the present invention, a system that securely downloads code may include, for example, a host processor and a security processor, the security processor being operatively coupled to the host processor. The security processor may receive, for example, a first command from the host processor. The first command may include, for example, information that the security processor uses to select a cryptographic key and to configure the security processor for a selected type of decryption and a selected type of authentication. The configured security processor may decrypt and authenticate, for example, a subsequently received command from the host processor in which the subsequently received command may include, for example, executable code.

In another embodiment according to certain aspects of the present invention, a system that securely downloads code may include, for example, a security processor. The security processor may receive, for example, a first command. The security processor may use a default decryption type and a default authentication type to decrypt and to authenticate the first command. The decrypted and authenticated command may include, for example, information that the security processor uses to select a cryptographic key and to configure the security processor for a selected type of decryption and a selected type of authentication. The configured security processor may decrypt and authenticate, for example, a subsequently received command in which the subsequently received command may include, for example, executable code.

These and other features and advantages of the present invention may be appreciated from a review of the following detailed description of the present invention, along with the accompanying figures in which like reference numerals refer to like parts throughout.

DETAILED DESCRIPTION OF THE INVENTION

Some embodiments according to the present invention may be related to, for example, systems and methods that support secure code downloading.

Some embodiments according to the present invention may provide, for example, a security processor that enables secure applications (e.g., set-top box applications). The security processor may provide, for example, safe havens where a key can be protected and an application program can execute without observation and interference by an attacker who may have direct physical access to the set-top box.

Some embodiments according to the present invention may provide, for example, that application programs may be verified (e.g., authenticated) before the application programs can be run. Furthermore, the configuration, reconfiguration and maintenance of the security processor may occur in the field and functions and/or features of the security processor may be field programmable.

Some embodiments according to the present invention may provide, for example, a security processor (e.g., a low-cost security processor) that may include, for example, a control/computational engine and a memory. At least a portion of the memory may be designated as secure. The security processor may be physically packaged to render the contents of the secure memory unavailable to attack.

Some embodiments according to the present invention may provide, for example, that configurations and/or programs may be signed and verified before the configurations and/or programs can be run on the security processor. The code-loading protocol may permit the process to be a one-round process, for example, from an authority to a device. A one-round process may simplify the process of distributing code. Software already installed in a device may be updated and application states may be preserved over an update.

Some embodiments according to the present invention may provide, for example, that a device (e.g., an un-tampered device) may be recovered from failure. The failure may be based on a failure in rewritable software including, for example, bugs in the code, failures in the memory storage (e.g., flash storage) of the code or an interruption during an update.

Figure 1:
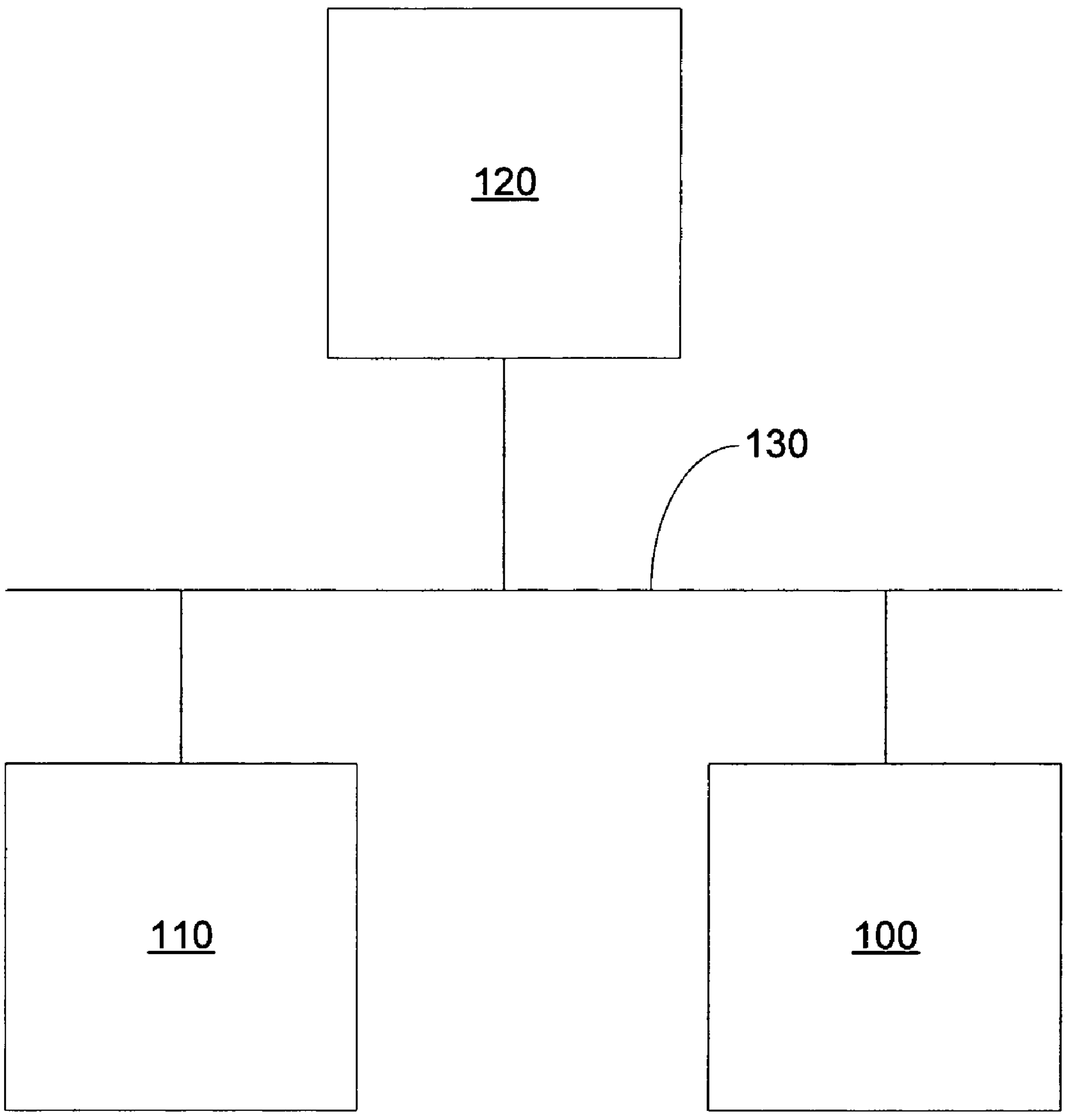
FIG. 1 shows a block diagram illustrating an embodiment of a system that supports secure code downloading according to some aspects of the present invention.

FIG. 1 shows a block diagram illustrating an embodiment of a system that supports secure code downloading according to some aspects of the present invention. The system may include, for example, a security processor 100, a host processor 110, a storage device 120 and a connection 130. The security processor 100, the host processor 110 and the storage device 120 may each be coupled to a link 130. The storage device 120 may be, for example, a flash memory, an SDRAM or another type of storage device. The storage device 120 may be internal or external, for example, to a system-on-a-chip (SoC). The storage device 120 may be internal or external, for example, to a set-top box. The link 130 may include, for example, one or more wired connections, buses, networks, wireless connections or combinations thereof. The link 130 may provide, for example, a communications medium between at least two of the security processor 100, the host processor 110 and the storage device 120. For example, the host processor 110 and the security processor 100 may be connected via buses and may be part of an SoC and/or a set-top box. The storage device 120 may be connected to the host processor 110 and the security processor 100 via buses and may be external to the SoC. In another example, the storage device 120 may be part of, for example, a set-top box. In yet another example, the storage device 120 may be external to a set-top box and may connected to the set-top box via one or more networks (e.g., a local area network (LAN), the Internet, etc.).

Figure 2:
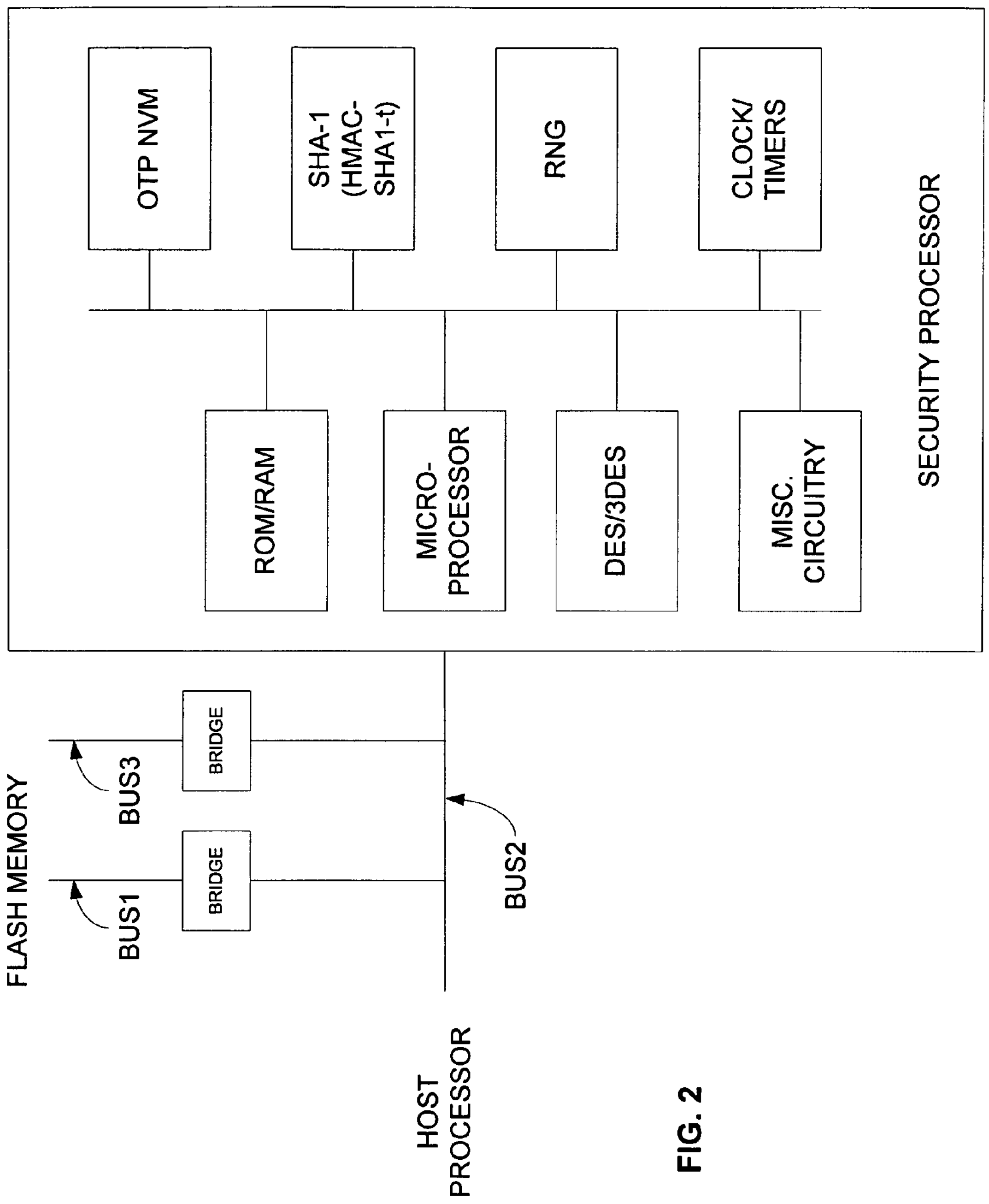
FIG. 2 shows a block diagram illustrating an embodiment of a system that supports secure code downloading according to some aspects of the present invention.
Figure 3:
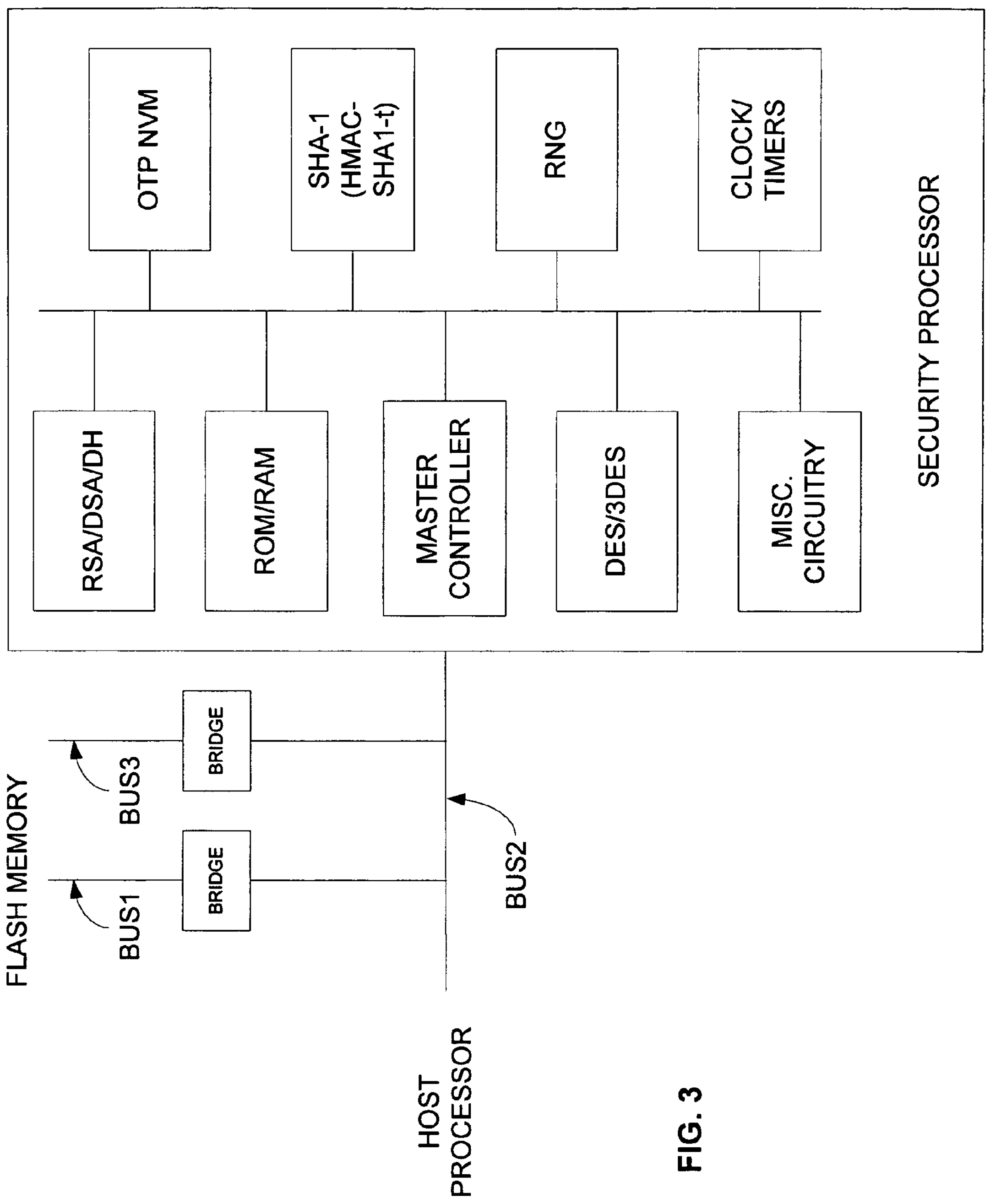
FIG. 3 shows a block diagram illustrating an embodiment of a system that supports secure code downloading according to some aspects of the present invention.

FIGS. 2 and 3 show block diagrams illustrating two embodiments of a system that supports secure code downloading according to some aspects of the present invention. Some embodiments according to the present invention may provide, for example, a security architecture that may be adapted for set-top box applications. Some embodiments according to the present invention may provide, for example, a security processor that employs low-cost security processor architecture. Referring to FIGS. 2 and 3, the security processor may operate as either a master, for example, to memory and some I/O devices or a slave, for example, to the host processor. Some embodiments according to the present invention may provide, for example, that, for some operations, the security processor may receive commands from the host processor. The security processor may then process the received commands and configure itself or execute particular security applications referred to in the received commands. The particular security applications referred to in the received commands may reside in RAM or may reside in ROM as pre-programmed ROM codes, for example.

FIG. 2 shows a block diagram illustrating an embodiment of a system that supports secure code downloading according to some aspects of the present invention. The security processor may include, for example, a microprocessor that, for example, executes code which implements various cryptographic applications. The security processor may also include, for example, one or more hardware acceleration blocks that can be used by applications and execution platforms for the secure code. The security processor may include, for example, one or more of the following hardware acceleration blocks: DES/3DES; SHA-1 (e.g., that may be capable of FIPS 186-2 Random Number Generation Processing) and HMAC-SHA1-t; and Random Number Generator (RNG).

Some security primitives (e.g., RSA, DSA, DH and AES) may reside in ROM or may be loaded as RAM codes and run in the microprocessor.

The security processor may include, for example, security operation modules such as, one or more of the following: a secure program execution space (e.g., in cache and RAM); an instruction ROM (or RAM); clock and timers (e.g., in a hardware block); a one-time-programmable non-volatile memory (OTP NVM); a self-test (e.g., a ROM code); a secure code loader (e.g., a ROM code with hardware access primitives such as, for example, 3DES and HMAC-SHA1-t); and other miscellaneous and various circuits.

Some embodiments according to the present invention may provide that the microprocessor have enough computational power, for example, to achieve the desired performance with respect to public key algorithms (e.g., RSA and DH algorithms). For example, the microprocessor's multiplier may be used to accelerate RSA and DH operations programmed as ROM codes. Some embodiments according to the present invention may provide a microprocessor including, for example, an ARM chip and/or MIPS technology, which may allow secure applications to be easily developed and ported.

The security processor employing a microcontroller architecture may support flexibility in some embodiments according to the present invention. The architecture may, for example, download security applications and run the downloaded security applications from RAM. Some embodiments according to the present invention that employ the microcontroller architecture may benefit from keeping hardware costs per unit low. However, the overall cost may not necessarily be the lowest.

FIG. 3 shows a block diagram illustrating an embodiment of a system that supports secure code downloading according to some aspects of the present invention. The security processor may include a master controller (e.g., a low-cost master controller) that, for example, executes ROM codes which access hardware crypto primitives for various cryptographic applications. The security processor may include, for example, one or more of the following hardware acceleration blocks: DES/3DES; SHA-1 (e.g., that may be capable of FIPS 186-2 Random Number Generation Processing) and HMAC-SHA1-t; RNG and RSA, DSA and DH algorithm.

The security processor may include, for example, security operation modules such as, one or more of the following: a secure program execution space (e.g., in RAM); an instruction ROM (or RAM); clock and timers (e.g., in a hardware block); an OTP NVM; a self-test (e.g., a ROM code); a secure code loader (e.g., a ROM code with hardware access primitives such as, for example, 3DES and HMAC-SHA1-t); and other miscellaneous and various circuits.

The security processor employing a master controller architecture may provide a low-cost solution for a reconfigurable security processor according to various embodiments of the present invention. The hardware acceleration blocks may assist the security processor by ensuring, for example, that the reconfiguration time for a secure application can be accomplished in a reasonable amount of time.

Some embodiments according to the present invention provide for a code downloading process that includes one or more of the following steps: setting up a code loader; and downloading a code.

Some embodiments according to the present invention provide that, in either step, the security processor may receive commands from the host processor and process the received commands. Using the received commands, the code loader may be set up and/or the code may be downloaded. In the set-up step, the security processor may configure the code loader based on the received command. In the download step, the security processor may verify (e.g., authenticate) the codes which are sent through the commands.

Commands to the security processor may follow a unified data structure regardless of the command type or the number of operations. The command may include, for example, an identifier (ID) that represents the command type. The type may indicate that the command is carrying encryption/decryption key materials, configuration information or other information. If the command indicates that further processing is required, then the security processor may then process the message through a secure application load.

An exemplary input command format is described in Table 1.

TABLE 1

Input Command Structure

| COMMAND PARAMETER | SIZE (BYTES) | DESCRIPTION |
|---|---|---|
| Identifier (ID) | 2 | Indicates the command type |
| Parameter Length | 2 | Number of bytes in command following this field |
| Parameter 1 | <variable> | Command specific parameters |
| Parameter 2 | <variable> | Command specific parameters |
| . | . | . |
| . | . | . |
| . | . | . |
| Parameter n | <variable> | Command specific parameters |

The output command structure may be similar to the input command structure and may include, for example, return data and status for each command type.

An exemplary output command format is described in Table 2.

TABLE 2

Output Command Structure

| COMMAND PARAMETER | SIZE (BYTES) | DESCRIPTION |
|---|---|---|
| Identifier (ID) | 2 | Indicates the command type |
| Parameter Length | 2 | Number of bytes in command following this field |
| Return Data and Status 1 | <variable> | Command specific parameters |
| Return Data and Status 2 | <variable> | Command specific parameters |
| . | . | . |
| . | . | . |
| . | . | . |
| Return Data and Status m | <variable> | Command specific parameters |

Some embodiments according to the present invention may provide that the security processor can execute one command at a time. During command execution, the command interface may be disabled until the command execution is complete.

In setting up the code loader, a LOADER_SETUP command may be used. The LOADER_SETUP command may, for example, set up a cipher and signature algorithm for the loading process. The LOADER_SETUP command may be locked by a field-programmable OTP bit. Without the LOADER_SETUP command, a default loader may be used in which, for example, a DH encryption with a DSA signature are set up. The signature verifier (e.g., DSA) of the default loader may be used, for example, to verify the LOADER_SETUP command.

An exemplary LOADER_SETUP input command format is described in Table 3.

TABLE 3

LOADER_SETUP Input Command Structure

| COMMAND PARAMETER | SIZE (BYTES) | VALUE/DESCRIPTION |
|---|---|---|
| Identifier (ID) | 2 | LOADER_SETUP |
| Parameter Length | 2 | 4 + 4 * m |
| Key Selection | 1 | 0x00: the root key 1<br>0x01: the root key 2<br>.<br>.<br>.<br>0xFF: the root key n |
| Scrambling Type | 1 | 0x00: Clear<br>0x01: 1DES encrypted<br>0x02: 3DES EDE ABA encrypted<br>0x03: 3DES EDE ABC encrypted<br>0x04: 3DES DED ABA encrypted<br>0x05: 3DES DED ABC encrypted<br>0x06: DH 1024-bit encrypted<br>.<br>.<br>. |
| Signature Type | 2 | 0x0000: Without signature<br>0x0001: Signed with SHA1-HMAC-64<br>0x0002: Signed with SHA1-HMAC-128<br>0x0003: Signed with SHA-1-1024-bit RSA<br>0x0004: Signed with DSA<br>.<br>.<br>. |
| Signature of this command | 4 * m | The signature of the data in this command before this field. Signed by a default signature generation algorithm. |

The LOADER_SETUP command may be sent by the host processor to instruct the security processor on how to set up the code loader.

An exemplary LOADER_SETUP output command format is described in Table 4.

TABLE 4

LOADER_SETUP Output Command Structure

| COMMAND PARAMETER | SIZE (BYTES) | VALUE/DESCRIPTION |
|---|---|---|
| Identifier (ID) | 2 | LOADER_SETUP |
| Parameter Length | 2 | 4 |
| Key Status | 1 | A bit vector indicating which key will be used.<br>Bit 0: the root key 1 |

TABLE 4-continued

LOADER_SETUP Output Command Structure

| COMMAND PARAMETER | SIZE (BYTES) | VALUE/DESCRIPTION |
|---|---|---|
| | | Bit 1: the root key 2<br>Bit 2: the root key 3<br>.<br>.<br>. |
| Scrambler Status | 2 | A bit vector indicating which scrambler is set up and passed.<br>Bit 0: Clear set up and passed<br>Bit 1: 1DES encryption set up and passed<br>Bit 2: 3DES EDE ABA encryption set up and passed<br>Bit 3: 3DES EDE ABC encryption set up and passed<br>Bit 4: 3DES DED ABA encryption and passed<br>Bit 5: 3DES DED ABC encryption and passed<br>Bit 6: DH encryption and passed<br>.<br>.<br>. |
| Signature Status | 1 | A bit vector indicating which signature algorithm is set up and passed.<br>Bit 0: The command signature fail<br>Bit 1: No signature set up and passed<br>Bit 2: Signed with SHA1-HMAC-64 set up and passed<br>Bit 3: Signed with SHA1-HMAC-128 set up and passed<br>Bit 4: Signed with SHA-1-1024-bit RSA set up and passed<br>Bit 5: Signed with DSA set up and passed<br>.<br>.<br>. |

The LOADER_SETUP output command may return the status of the set-up of the code loader.

In loading new configurations and codes, a CONFIG_CODE_LOAD command may be used. An exemplary CONFIG_CODE_LOAD input command is described in Table 5 and an exemplary CONFIG_CODE_LOAD output command is described in Table 6.

TABLE 5

CONFIG_CODE_LOAD Input Command Structure

| COMMAND PARAMETER | SIZE (BYTES) | VALUE/DESCRIPTION |
|---|---|---|
| Identifier (ID) | 2 | CONFIG_CODE_LOAD |
| Parameter Length | 2 | 8 * m + 4 |
| Mode | 4 | Case 1: "the clear configuration mode" (8 * m Bytes) data with a format specified by application;<br>Case 2: Encrypted without signature (8 Bytes) - An encrypted version of "the clear mode". The encryption algorithm is specified by the LOADER_SETUP command.<br>Case 3: Encrypted and signed with 8-Byte signature (16 Byte) -- An encrypted version of "the clear mode". The encryption and signing algorithms are specified by the LOADER_SETUP command.<br>Case 4: Encrypted and signed with 16-Byte signature (16 Byte) -- An encrypted version of "the clear mode". The encryption and signing algorithms are specified by the LOADER_SETUP command.<br>.<br>.<br>. |
| Data | 8 * m | Data determined by the mode. |

TABLE 6

CONFIG_CODE_LOAD Output Command Structure

| COMMAND PARAMETER | SIZE (BYTES) | VALUE/DESCRIPTION |
|---|---|---|
| Identifier (ID) | 2 | CONFIG_CODE_LOAD |
| Parameter Length | 2 | 4 |
| Loading Status | 4 | A bit vector that indicates if the loading is successful.<br>Bit 0: Case 1 loading;<br>Bit 1: Case 2 loading;<br>Bit 2: Case 3 loading;<br>Bit 3: Case 4 loading;<br>.<br>.<br>. |

Some embodiments according to the present invention provide a security processor with the ability of loading secure application configuration, key and code for execution of trusted processes within a secure environment. The applications may be programmed and configured by properly formatted commands. The commands may be generated, for example, by a host processor, a head-end server, etc.

Figure 4:
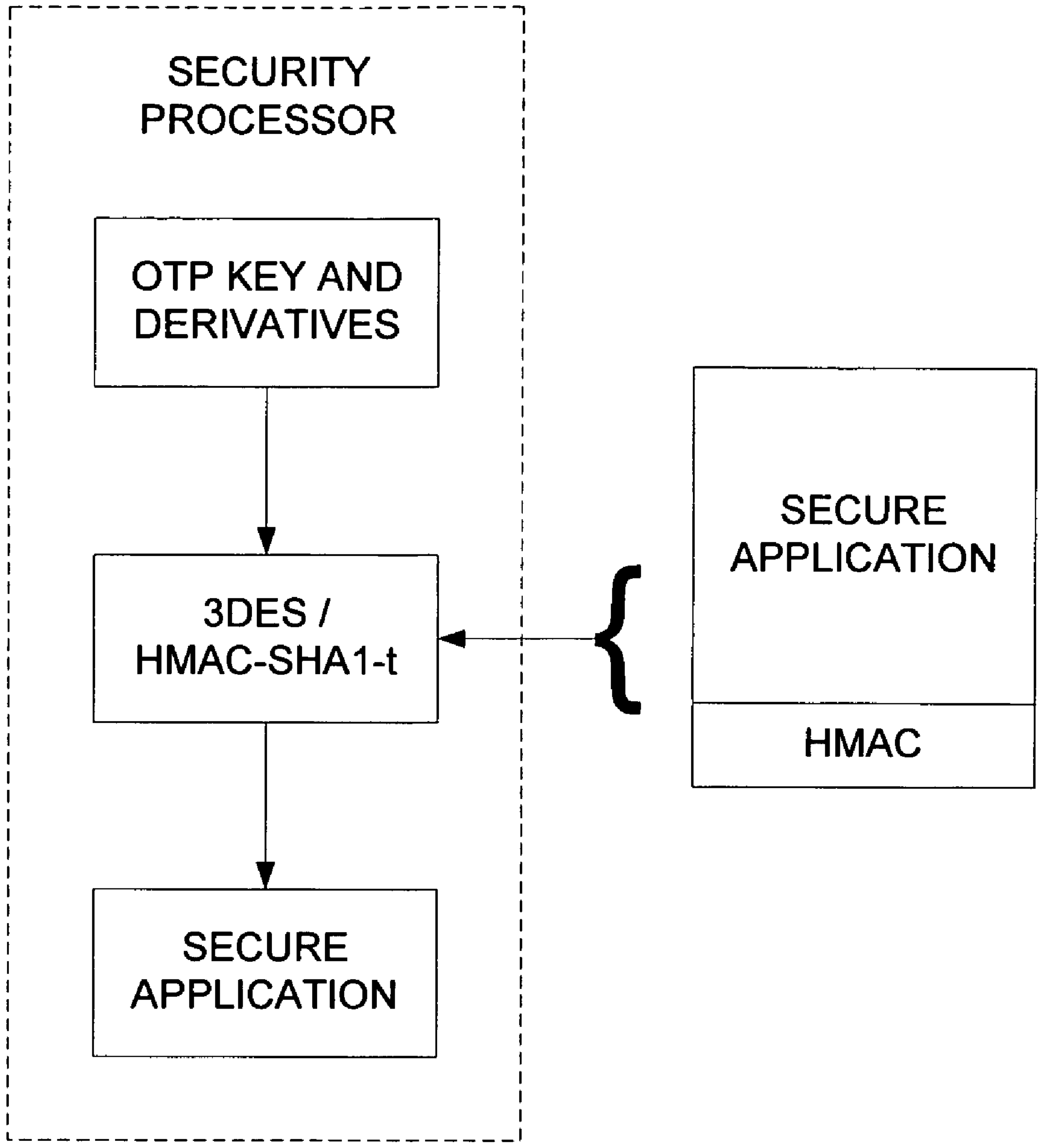
FIG. 4 shows a block diagram illustrating an embodiment of a process that loads a secure application according to some aspects of the present invention.

Some embodiments according to the present invention may provide a security processor that provides a secure platform for secure applications. FIG. 4 shows a block diagram illustrating an embodiment of a process that loads a secure application according to some aspects of the present invention. Referring to FIG. 4, a secure application key may be loaded. The loaded key may then be used by the security processor to decrypt (e.g., using 3DES) and to verify (e.g., using HMAC-SHA1-t) the secure application code. The secure application code may then be loaded into data memory (e.g., internal data memory) of the security processor for execution.

Figure 5:
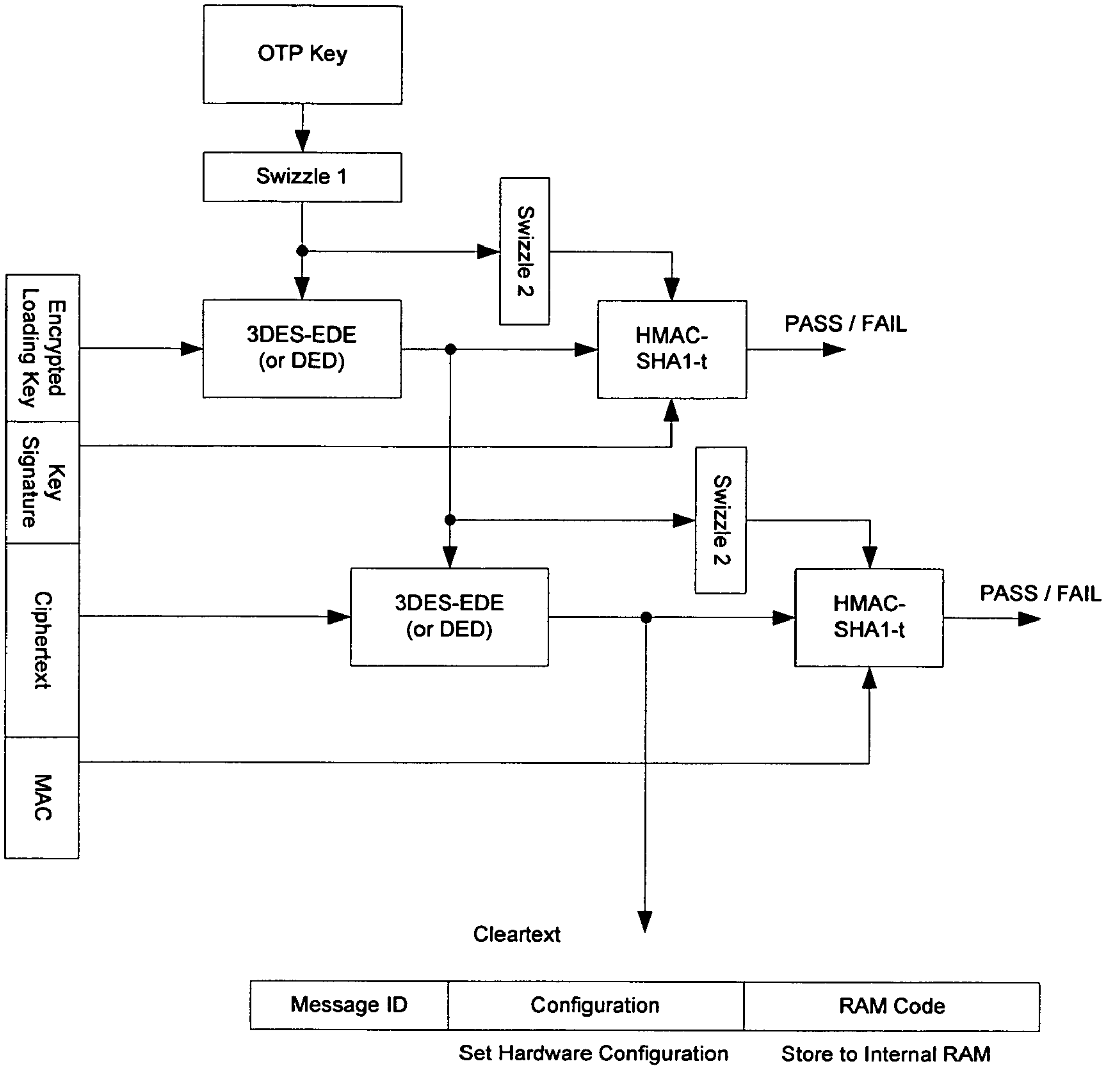
FIG. 5 shows a block diagram illustrating an embodiment of a process that loads a secure configuration according to the present invention.

Some embodiments according to the present invention may provide that a secure configuration load can be performed using keys derived from the OTP key or ROM key. FIG. 5 shows a block diagram illustrating an embodiment of a process that loads a secure configuration according to the present invention.

Referring to FIG. 5, some embodiments according to the present invention may employ, for example, an encryption/decryption chain (e.g., a 3DES-EDE or a DED encryption/decryption chain). The encryption/decryption chain may use, for example, an OTP key stored in an OTP memory to "unwrap" the encrypted loading key and the encrypted configuration. The loading key and configuration may be provided as a message that can be signed, for example, by an authorized server. The signature may be generated by using the HMAC-SHA1-t algorithm. The signature may be used, for example, to ensure that only authorized secure keys can be loaded into the security processor. Swizzle blocks (e.g., swizzle block 1 and swizzle block 2) may be adapted, for example, to manipulate keys for HMAC-SHA1-t signature verification.

Some embodiments according to the present invention may employ a message format for symmetric decryption and hardware acceleration to decrypt (e.g., 3DES) and to authenticate (e.g., HMAC-SHA1) an entire data block.

A data block may include, for example, a Message ID that indicates that the data block includes, for example, executable code. A configuration block may be included to configure, for example, the security processor hardware prior to the execution of the secure code. The configuration block may be used to limit access to secure peripherals within the security processor (or within control of the security processor) to particular types of secure applications. The configuration block may be used to configure, for example, the instruction and scratch memory space (e.g., in internal memory, cache, RAM, etc.) within the security processor.

After the security processor configures the hardware and completes the authentication of the executable code, the security processor may switch into execution mode. Once in execution mode, the hardware configuration may not be changed by the secure application code. The internal address structure of the security processor may be remapped to execute from internal ROM. Other processor state, peripheral state, memory state, etc. may be cleared when the security processor transitions to executing secure application code.

The process for loading new executable code may be initiated by the secure application code using means that may be programmed into the code. The hardware configuration of the security processor may not be dynamically changed by the current executing program according to some embodiments of the present invention. In various embodiments according to the present invention, the hardware configuration may only be changed via the configuration data of the secure program loading process. The CONFIG_CODE_LOAD command may be used to load new configurations/applications.

The following are hereby incorporated herein by reference in their entirety: FIPS-PUB 46-3, "Data Encryption Standard (DES)" (Oct. 25, 1999); FIPS-PUB 197, "Advanced Encryption Standard (AES)" (Nov. 26, 2001); RSA1, "PKCS #1: RSA Encryption Standard", Version 1.5, RSA Laboratories (November 1993); RSA2, "PKCS #1 v2.0: RSA Encryption Standard", Version 2.0, RSA Laboratories (Oct. 1, 1999); "PKCS #3: Diffie-Hellman Key-Agreement Standard", Version 1.4 (Nov. 1, 1993); FIPS-PUB 180-1, "Secure Hash Standard", Federal Information Processing Standards Publication (FIPS PUB) (Jan. 27, 2000); IETF RFC 2104, "HMAC: Keyed-Hashing for Message Authentication", Krawczyk, Bellare and Canetti (March 1996); and FIPS PUB 186-1 (May 18, 1994) and FIPS PUB 186-2 (Jan. 27, 2000), "Digital Signature Standard", Federal Information Processing Standards Publication (FIPS PUB).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for secure code downloading, comprising:

(a) receiving, via a bus, a host command in a security processor from a host processor, wherein the host processor, the security processor and the bus are part of a system on a chip in a set-top box, the host command having a data structure that is independent of command type and number of operations, wherein the security processor swizzles a one-time programmable key stored in the security processor and uses the swizzled one-time programmable key to decrypt an encrypted loading key of the received command, wherein the security processor uses a key signature of the received command, the decrypted loading key and the swizzled one-time programmable key to verify the decrypted loading key before loading into the security processor;

(b) loading the decrypted loading key based on the received command;

(c) configuring the security processor with a selected scrambling type and a selected signature type based on the received command, wherein the security processor outputs a status command of a status of the configuring of the security processor; and (d) processing incoming code using the loaded key and the configured security processor.

2. The method according to claim 1, further comprising: sending a message indicating the loaded key and the code loader configuration.

3. The method according to claim 1, wherein (b) comprises determining the loaded key based on a value residing in a one-time-programmable non-volatile memory of the security processor.

4. The method according to claim 1, wherein (b) comprises determining the loaded key based on a value residing in a read-only memory of the security processor.

5. The method according to claim 1, wherein (b) comprises loading a selected root key based on the received command.

6. The method according to claim 1, wherein the selected scrambling type comprises DES scrambling or 3DES scrambling.

7. The method according to claim 1, wherein the selected signature type comprises a signature type using a one-way hash function.

8. The method according to claim 1, wherein the selected signature type comprises a signature type using at least one of SHA-1, HMAC-SHA1, HMAC-SHA1-t and DSA.

9. The method according to claim 1, wherein (d) comprises decrypting the incoming code.

10. The method according to claim 9, wherein (d) comprises authenticating the decrypted code.

11. The method according to claim 1, further comprising: executing the processed code.

12. The method according to claim 11, further comprising: locking configurations of the security processor while the secure processor is executing the processed code.

13. The method according to claim 11, wherein configurations of the security processor cannot be changed by the executed code.

14. The method according to claim 11, wherein executing the processed code comprises remapping an internal address structure of the security processor to execute from an internal read-only memory.

15. The method according to claim 11, further comprising: clearing at least one of a processor state, peripheral state and a memory state once the security processor begins to execute the code.

16. The method according to claim 1, further comprising:

configuring an instruction memory space and a scratch memory space of the security processor based on the received command.

17. The method according to claim 1, further comprising:

limiting access to secure peripherals of the security processor based on the received command.

18. The method according to claim 1, further comprising:

loading processed code into an internal data memory of the security processor for execution.

19. The method according to claim 1, further comprising:

receiving the incoming code via the received command or a subsequent command.

20. The method according to claim 1, further comprising:

locking the received command using one or more field-programmable, one-time-programmable bits.

21. A system for secure code downloading, comprising:

a host processor; and a security processor operatively coupled to the host processor via a bus, wherein the host processor, the security processor and the bus are part of a system on a chip, wherein the security processor operates as a master device and as a slave device, wherein security processor receives a first command from the host processor, wherein, while the security processor is executing the first command, a command interface of the security processor is disabled, wherein the first command comprises information that the security processor uses to select a cryptographic key and to configure the security processor for a selected type of decryption and a selected type of authentication, wherein the security processor swizzles a one-time programmable key stored in the security processor and uses the swizzled one-time programmable key to decrypt an encrypted loading key of the first command, wherein the security processor uses a key signature of the first command, the decrypted loading key and the swizzled one-time programmable key to verify the decrypted loading key before loading into the security processor, and wherein the configured security processor decrypts and authenticates a subsequently received command from the host processor, the subsequently received command comprising executable code.

22. The system according to claim 1, wherein the security processor sends a particular command to the host processor, the particular command comprising information relating to the selected cryptographic key, the selected type of decryption and the selected type of authentication.

23. The system according to claim 1, wherein the first command is decrypted and authenticated by the security processor using default settings.

24. The system according to claim 21, wherein the security processor comprises a microprocessor, an encryption/decryption hardware acceleration block, authentication hardware acceleration block and a random number generator.

25. The system according to claim 21, wherein the security processor comprises a master controller, an encryption/decryption hardware acceleration block, authentication hardware acceleration block and a random number generator.

26. The system according to claim 21, wherein the security processor comprises one-time-programmable non-volatile memory.

27. The system according to claim 26, wherein the one-time-programmable non-volatile memory stores a value from which the selected cryptographic key is determined.

28. The system according to claim 26, wherein the security processor comprises read-only memory, wherein the read-only memory stores a value from which the selected cryptographic key is determined.

29. The system according to claim 21, wherein the security processor configures instruction memory space and scratch memory space based on the first command.

30. The system according to claim 21, wherein the first command comprises a first field that indicates a command type, a second field that indicates a scrambling type and a third field that indicates a signature type.

31. The system according to claim 30, wherein the first command comprises a fourth field that comprises a signature of a portion of the first command.

32. The system according to claim 21, wherein the subsequently received command comprises a first field that indicates a command type, a second field that indicates a loading type and a third field that comprises data.

33. The system according to claim 21, wherein the security processor executes the executable code once after the subsequently received command has been successfully decrypted and authenticated.

34. The system according to claim 21, wherein configurations of the security processor cannot change while the security processor is executing the executable code.

35. The system according to claim 21, wherein the executable code cannot change configurations of the security processor.

36. A system for secure code downloading, comprising:

a security processor receiving, via a bus, a first command from a host processor that instructs the security processor on how to configure one or more code loaders of the security processor, wherein the host processor, the security processor and the bus are part of a system on a chip, wherein the security processor swizzles a one-time programmable key stored in the security processor and uses the swizzled one-time programmable key to decrypt an encrypted loading key of the first command, wherein the security processor uses a key signature of the first command, the decrypted loading key and the swizzled one-time programmable key to verify the decrypted loading key before loading into the security processor, wherein the decrypted and authenticated command comprises information that the security processor uses to select a cryptographic key and to configure the security processor for a selected type of decryption and a selected type of authentication, wherein the decrypted and authenticated command is locked by a field-programmable one-time-programmable bit, and wherein the configured security processor decrypts and authenticates a subsequently received command, the subsequently received command comprising executable code.

37. The system according to claim 36, wherein the security processor comprises one-time-programmable non-volatile memory.

38. The system according to claim 37, wherein the one-time-programmable non-volatile memory stores a value from which the selected cryptographic key is determined.

39. The system according to claim 36, wherein the security processor executes the executable code once after the subsequently received command has been successfully decrypted and authenticated using the selected cryptographic key, the selected decryption type and the selected authentication type.

40. The system according to claim 37, wherein configurations of the security processor cannot be changed while the security processor is executing the executable code.

41. The system according to claim 37, wherein configurations of the security processor cannot be changed by the executable code.

* * * * *